United States Patent
Ohbayashi et al.

(10) Patent No.: US 9,834,210 B2
(45) Date of Patent: Dec. 5, 2017

(54) DRIVING SUPPORT DEVICE FOR VEHICLE

(71) Applicant: TOYOTA JIDOSHA KABUSHIKI KAISHA, Toyota-shi, Aichi (JP)

(72) Inventors: Motonari Ohbayashi, Nagakute (JP); Akihiro Kida, Toyota (JP); Toshihiro Takagi, Nisshin (JP); Masashi Yamazaki, Toyota (JP); Tatsuya Nishi, Toyota (JP); Hironobu Ishijima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/298,874

(22) Filed: Oct. 20, 2016

(65) Prior Publication Data
US 2017/0203757 A1   Jul. 20, 2017

(30) Foreign Application Priority Data

Jan. 20, 2016   (JP) ................................. 2016-008791

(51) Int. Cl.
| | |
|---|---|
| *B60W 30/08* | (2012.01) |
| *B60W 30/085* | (2012.01) |
| *B60W 10/20* | (2006.01) |
| *B60W 10/18* | (2012.01) |
| *B60W 30/06* | (2006.01) |

(52) U.S. Cl.
CPC .......... *B60W 30/085* (2013.01); *B60W 10/18* (2013.01); *B60W 10/20* (2013.01); *B60W 30/06* (2013.01); *B60W 2420/52* (2013.01); *B60W 2550/10* (2013.01); *B60W 2710/18* (2013.01); *B60W 2710/20* (2013.01)

(58) Field of Classification Search
CPC .................................................. B60W 30/085
See application file for complete search history.

(56) References Cited

U.S. PATENT DOCUMENTS

| | | | | |
|---|---|---|---|---|
| 8,862,383 | B2 * | 10/2014 | Tsuchida | ............... G01S 13/931 180/169 |
| 9,731,717 | B2 * | 8/2017 | Kim | ...................... B60W 30/09 |
| 2007/0129891 | A1 * | 6/2007 | Yano | ........................ B60T 7/22 701/301 |
| 2007/0132563 | A1 * | 6/2007 | Balbale | .................. B60Q 9/004 340/435 |
| 2007/0299610 | A1 * | 12/2007 | Ewerhart | .................. B60T 7/22 701/301 |

(Continued)

FOREIGN PATENT DOCUMENTS

JP   2013-220809 A   10/2013

*Primary Examiner* — Alex C Dunn
(74) *Attorney, Agent, or Firm* — Oliff PLC (57) ABSTRACT

A frequency of an unnecessary operation of automatic braking due to a reflected wave from a guard rail is decreased. When a collision avoidance control unit determines that an obstacle detected by a radar sensor and an own vehicle are highly likely to collide with each other, the collision avoidance control unit reads a state signal output by a parking support control unit, and determines whether or not the state signal indicates a specific state, which is a state where parallel parking support is being carried out or a state where exit support is being carried out. When the state signal indicates the specific state, the collision avoidance control unit inhibits the automatic braking.

2 Claims, 7 Drawing Sheets

(56) References Cited

U.S. PATENT DOCUMENTS

| | | | |
|---|---|---|---|
| 2010/0283632 A1* | 11/2010 | Kawabata | B62D 15/027 |
| | | | 340/932.2 |
| 2012/0089294 A1* | 4/2012 | Fehse | B60W 30/06 |
| | | | 701/25 |
| 2012/0090395 A1* | 4/2012 | Lavoie | G01S 7/52006 |
| | | | 73/620 |
| 2013/0124041 A1* | 5/2013 | Belser | B60W 30/095 |
| | | | 701/41 |
| 2016/0114798 A1* | 4/2016 | Kim | B60W 30/09 |
| | | | 701/41 |
| 2016/0272244 A1* | 9/2016 | Imai | G08G 1/166 |
| 2017/0028985 A1* | 2/2017 | Kiyokawa | B62D 15/0285 |
| 2017/0032679 A1* | 2/2017 | Tomozawa | G08G 1/168 |
| 2017/0106859 A1* | 4/2017 | Kim | B60W 30/09 |

\* cited by examiner

DRIVING SUPPORT DEVICE FOR VEHICLE

BACKGROUND OF THE INVENTION

1. Field of the Invention

The present invention relates to a driving support device for operating automatic braking so as to avoid a collision between an own vehicle and an obstacle, thereby supporting driving of a driver.

2. Description of the Related Art

Hitherto, for example, as proposed in Japanese Patent Application Laid-open No. 2013-220809, there is a known driving support device including radar sensors installed at a rear right corner and a rear left corner of a vehicle body, and using those sensors to detect an obstacle approaching the own vehicle from a rear lateral region during backward travel of the own vehicle, thereby notifying a driver of the existence of the obstacle. Moreover, there is a known collision avoidance system for operating automatic braking when an obstacle is highly likely to collide with an own vehicle, thereby avoiding the collision of the own vehicle with the obstacle.

Thus, a collision avoidance system (referred to as "rear-end collision avoidance support system") for using a radar sensor to detect an obstacle approaching an own vehicle from a rear lateral region when the own vehicle is traveling backward, and operating automatic braking when the own vehicle is highly likely to collide with the obstacle, thereby avoiding the collision of the own vehicle with the obstacle, is conceivable. In the rear-end collision avoidance support system, for example, in a case where the own vehicle is exiting backward from a parking lot, the driving of the driver can be supported so as to avoid a collision with another vehicle laterally crossing a rear lateral region of the own vehicle.

However, when the own vehicle approaches a guard rail while traveling backward, the rear-end collision avoidance support system may erroneously determine the guard rail to be another vehicle approaching the own vehicle from the rear lateral region depending on the situation, thereby operating automatic braking. A description is now given of a reason for this.

For example, the rear-end collision avoidance support system is configured to use a radar sensor to transmit an electric wave in the millimeter band (referred to as "millimeter wave"), and receive a reflected wave thereof when an obstacle (3D object) reflecting the millimeter wave exists in a transmission range. In particular, when the obstacle is a metal body, a reflected wave having high signal intensity is received. The radar sensor is configured to generate a signal (beat signal) having a beat frequency acquired by signal processing applied to the transmitted wave and the received wave, set a direction in which an output peak of the beat signal is detected as a direction in which the obstacle exists, and calculate a distance between the radar sensor and the obstacle in this direction. One point of the obstacle is acquired as a detection point based on the direction and distance. An electronic control device including the rear-end collision avoidance support system is configured to acquire the detection point of the obstacle at a predetermined sampling cycle from the radar sensor, and determine a likelihood of the collision of the obstacle with the own vehicle based on a predicted travel route of the obstacle predicted from a transition of the detection point (transition of a relative positional relationship between the own vehicle and the obstacle) and a predicted backward travel route of the own vehicle. The electronic control device is configured to operate the automatic braking when the electronic control device determines that the likelihood of the collision is high.

Figure 4:
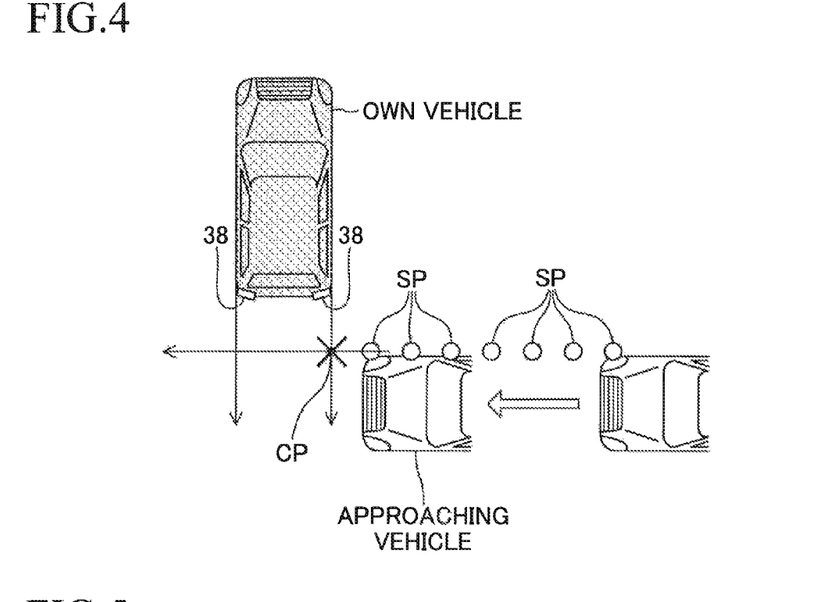
FIG. 4 is an explanatory diagram for illustrating a transition of a detection point of another vehicle and a cross point.

For example, when, as illustrated in FIG. 4, another vehicle approaches the backward travel route of the own vehicle from the rear lateral region of the own vehicle so as to cross the backward travel route, a detection point SP approaching the backward travel route of the own vehicle is detected by a radar sensor 38. As a result, the automatic braking is operated, and consequently, the collision of the own vehicle with the another vehicle can be prevented.

However, when the own vehicle travels backward while approaching a guard rail (metal body), a detection point detected based on a reflected wave reflected by the guard rail may transition so as to cross the backward travel route of the own vehicle. In this case, the electronic control device erroneously determines the detection point on the guard rail as a detection point of another vehicle approaching the backward travel route of the own vehicle so as to cross the backward travel route.

Figure 5:
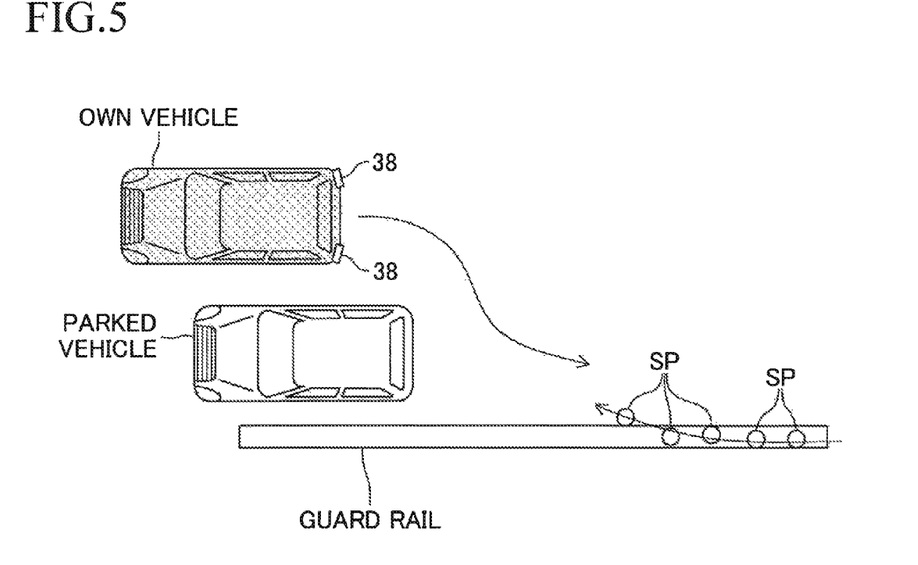
FIG. 5 is an explanatory diagram for illustrating a transition of a detection point during parallel parking.

For example, as illustrated in FIG. 5, when parallel parking is carried out along a guard rail, a detection point SP of the guard rail detected by the radar sensor 38 may move so as to cross the backward travel route of the own vehicle as the own vehicle turns. In this case, the automatic braking is unnecessarily operated during the parallel parking.

Figure 6:
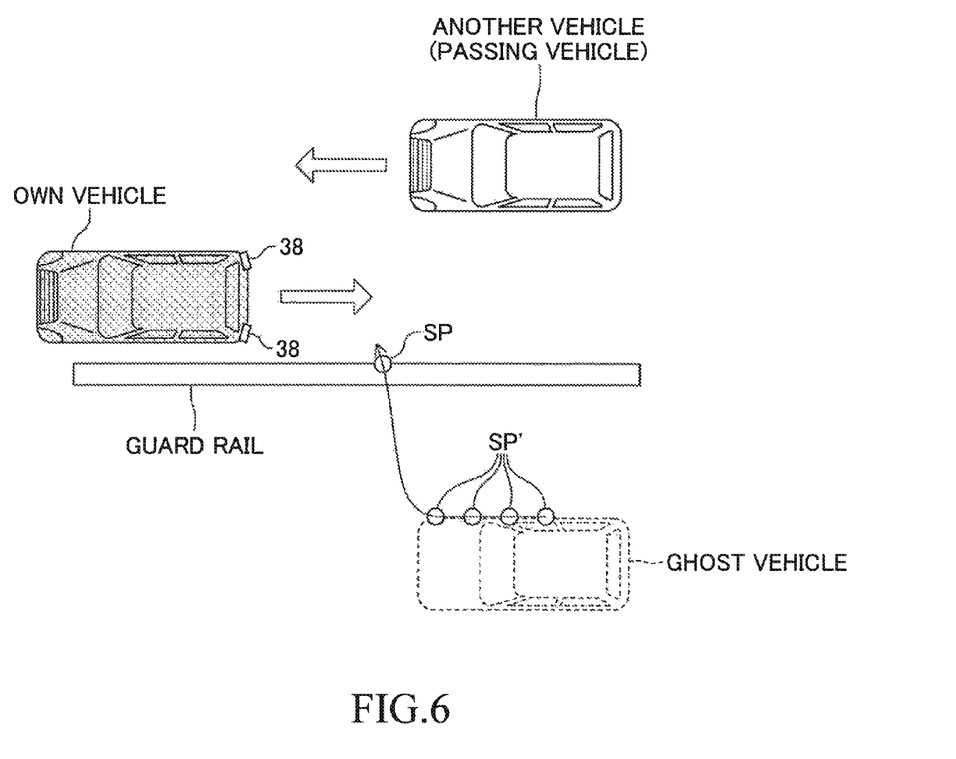
FIG. 6 is an explanatory diagram for illustrating detection points of a ghost vehicle.

Moreover, for example, as illustrated in FIG. 6, when another vehicle passes by the own vehicle while the own vehicle is traveling backward parallel to a guard rail, the millimeter wave transmitted by the radar sensor 38 of the own vehicle may be reflected by the another vehicle, and the reflected wave may be further reflected by the guard rail, to thereby be received by the radar sensor 38. In this case, a detection point SP' is detected in a direction in which the radar sensor 38 receives the reflected wave. This detection point SP' appears on an opposite side of the own vehicle with respect to the guard rail. Thus, the transition of the detection point SP' is determined as another vehicle passing on the opposite side with respect to the guard rail. This determined another vehicle is a ghost vehicle which does not actually exist, and this detection point SP' is referred to as a ghost detection point SP'. Incidentally, the millimeter wave transmitted by the radar sensor 38 toward the guard rail may be directly reflected by the guard rail, to thereby be received by the radar sensor 38. As a result, the detection point SP of the guard rail and the ghost detection point SP' are combined, and the detection points SP and SP' may transition so as to cross the backward travel route of the own vehicle. In this case, the automatic braking is unnecessarily operated during the backward travel of the own vehicle.

SUMMARY OF THE INVENTION

The present invention has been made in view of the above-mentioned problem, and therefore has an object to decrease the frequency of the unnecessary operation of the automatic braking due to the reflected wave from the guard rail.

In order to achieve the above-mentioned object, a feature of one embodiment of the present invention resides in a driving support device, including:

a rear-end collision avoidance support system (20, 37, 38, 50, 60, 73) for using a radar sensor (38) to detect an obstacle approaching a backward travel route of an own vehicle so as to cross the backward travel route, and operating automatic braking of the own vehicle when the obstacle is highly likely to collide with the own vehicle;

a parking support system (10, 31 to 37, 40, 71, 72) having at least a parallel parking function, for automatically steering a steered wheel so that the own vehicle travels along a target path for parking the own vehicle at a target parking position;

state determination means (S14) for determining whether or not a specific state where the parking support system carries out an operation of parallel parking the own vehicle holds true; and automatic braking inhibition means (S18) for inhibiting an operation of the automatic braking by the rear-end collision avoidance support system when the specific state is determined to hold true.

The driving support device according to the one embodiment of the present invention includes the rear-end collision avoidance support system and the parking support system. The rear-end collision avoidance support system is configured to use the radar sensor to detect the obstacle (3D object) approaching the backward travel route of the own vehicle so as to cross the backward travel route, and operate the automatic braking of the own vehicle when the obstacle is highly likely to collide with the own vehicle. For example, when another vehicle has approached the backward travel route of the own vehicle from a rear lateral region of the own vehicle, the another vehicle is detected by the radar sensor. Then, when the another vehicle is highly likely to collide with the own vehicle, the automatic braking is operated to stop the own vehicle. For example, the rear-end collision avoidance support system calculates an indication value representing the likelihood of the collision of an obstacle with the own vehicle, and determines that the obstacle is highly likely to collide with the own vehicle when this indication value exceeds a reference value set in advance, to thereby operate the automatic braking of the own vehicle. The automatic braking means generation of a braking force on the own vehicle without requiring a brake pedal operation by a driver.

On the other hand, the parking support system includes at least the parallel parking function, and is configured to automatically steer a steered wheel so that the own vehicle travels along a target path for parking the own vehicle at a target parking position. The automatic steering means steering of the steered wheel without requiring a steering operation by the driver.

When an electric wave transmitted from the radar sensor is reflected by a guard rail, and the reflected wave is received by the radar sensor, the automatic braking may unnecessarily be operated. When the own vehicle approaches a guard rail while traveling backward, the own vehicle is carrying out parallel parking in most cases. Thus, the state determination means determines whether or not the specific state where the parking support system carries out the operation of the parallel parking of the own vehicle holds true. When the specific state is determined to hold true, the automatic braking inhibition means inhibits the rear-end collision avoidance support system from operating the automatic braking.

Thus, according to the present invention, the frequency of the unnecessary operation of the automatic braking due to the reflected wave from the guard rail can be decreased. As a result, the automatic braking is prevented from being operated during parallel parking, and the parallel parking support function can thus be effectively used. Moreover, when the own vehicle is carrying out parallel parking along a guard rail, another vehicle rarely approaches the own vehicle from the laterally rear region of the own vehicle. Thus, even when the automatic braking by the rear-end collision avoidance support system is inhibited from being operated, this inhibition does not practically lead to a decrease in the function of the rear-end collision avoidance support system.

A feature of one aspect of the present invention resides in that the parking support system includes a parallel parking exit function of automatically steering the steered wheel so that the own vehicle travels along a target path for causing the own vehicle to exit from a parallel parking state; and the specific state includes a state where the parking support system carries out an operation of causing the own vehicle to exit from the parallel parking state (S15).

According to the one aspect of the present invention, the parking support system includes the parallel parking exit function of automatically steering the steered wheel so that the own vehicle travels along the target path for causing the own vehicle to exit from the parallel parking state. When the own vehicle is caused to exit from the parallel parking state by the parking support system, the exit may involve the backward travel operation of the own vehicle, and the automatic braking may thus unnecessarily be operated due to the reflected wave from the guard rail. Thus, according to the one aspect of the present invention, the specific state includes the state where the parking support system carries out the operation of causing the own vehicle to exit from the parallel parking state. Therefore, the automatic braking is inhibited from being operating also in the support of exit from the parallel parking state. Thus, the frequency of the unnecessary operation of the automatic braking due to the reflected wave from the guard rail can be further decreased.

In the above description, reference numerals used in an embodiment of the present invention are enclosed in parentheses and are assigned to each of the constituent features of the invention corresponding to the embodiment in order to facilitate understanding of the invention. However, each of the constituent features of the invention is not limited to the embodiment defined by the reference numerals.

DETAILED DESCRIPTION OF THE PREFERRED EMBODIMENTS

Figure 1:
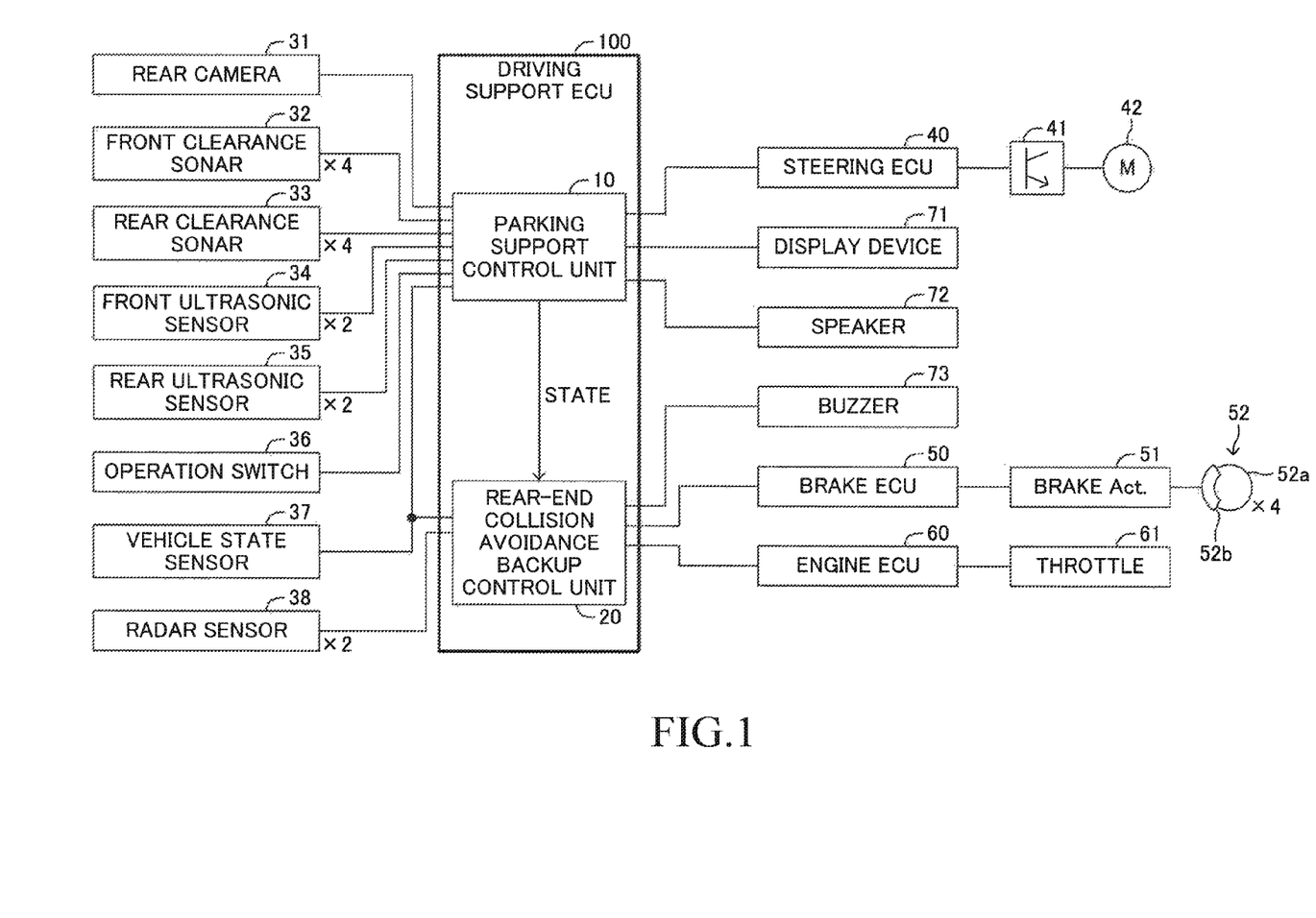
FIG. 1 is a schematic system configuration diagram for illustrating a driving support device according to an embodiment of the present invention.

Referring to the accompanying drawings, an embodiment of the present invention is described in detail below. FIG. 1 is a schematic system configuration diagram for illustrating a driving support device according to this embodiment.

The driving support device includes a driving support ECU 100 including a microcomputer as a main component. "ECU" is an abbreviation of electric control unit. The microcomputer herein includes a CPU and storage devices such as a ROM and a RAM, and the CPU is configured to implement various functions by executing instructions (programs) stored in the ROM. Moreover, the vehicle on which the driving support device is installed is referred to as "own vehicle" when the vehicle needs to be distinguished from other vehicles.

The driving support ECU 100 is divided into a parking support control unit 10 and a rear-end collision avoidance support control unit 20 in terms of control processing functions of the microcomputer. The parking support control unit 10 is a control function unit for automatically steering steered wheels so that the own vehicle travels along a target path for causing the own vehicle to park at a target parking position. The rear-end collision avoidance support control unit 20 is a control functional unit for detecting an obstacle (3D object) approaching from a rear lateral region of the own vehicle when the own vehicle travels backward, and operating automatic braking so as to avoid a collision between the own vehicle and the obstacle. The rear-end collision avoidance support control unit 20 is hereinafter simply referred to as collision avoidance control unit 20. Moreover, the control carried out by the parking support control unit 10 is referred to as parking support control. The control carried out by the collision avoidance control unit 20 is referred to as collision avoidance control.

A rear camera 31, front clearance sonars 32, rear clearance sonars 33, front ultrasonic sensors 34, rear ultrasonic sensors 35, an operation switch 36, a vehicle state sensor 37, and radar sensors 38 are connected to the driving support ECU 100. Moreover, the driving support ECU 100 is connected to a steering ECU 40, a brake ECU 50, and an engine ECU 60 so that they can communicate with each other. Moreover, the driving support ECU 100 is connected to a display device 71, a speaker 72, and a buzzer 73.

The rear camera 31 is a camera for imaging a vehicle rear region, and is installed on a rear portion of a vehicle body so that an optical axis thereof is directed in a direction for enabling imaging of parking partition lines in the vehicle rear region. The parking support control unit 10 is configured to display a parking support image, which is acquired by synthesizing the rear view image taken by the rear camera 31 with parking space lines, extensions of vehicle width, a predicted travel route line, distance scale lines, and the like, on the display device 71.

The front clearance sonars 32 are configured to detect obstacles in a front region and a front corner region of the vehicle, and a plurality (four in this example) thereof are mounted at intervals in a vehicle width direction on a front portion (e.g., a front bumper) of the vehicle body. The rear clearance sonars 33 are configured to detect obstacles in a rear region and a rear corner region of the vehicle, and a plurality (four in this example) thereof are mounted at intervals in the vehicle width direction on a rear portion (e.g., a rear bumper) of the vehicle body.

The front ultrasonic sensors 34 are configured to detect obstacles on left and right lateral regions on the front side of the vehicle, and one is mounted on each of the left and right sides on the front side of the vehicle body so as to form a pair. The rear ultrasonic sensors 35 are configured to detect obstacles on left and right lateral regions on the rear side of the vehicle, and one is mounted on each of the left and right sides on the rear side of the vehicle body so as to form a pair.

Those front clearance sonars 32, rear clearance sonars 33, front ultrasonic sensors 34, and rear ultrasonic sensors 35 supply signals each representing a distance to an obstacle detected in each detection area (represented as ellipsoids in FIG. 2) to the parking support control unit 10. When an obstacle is not detected, signals each representing the longest distance are supplied to the parking support control unit 10 from the front clearance sonars 32, the rear clearance sonars 33, the front ultrasonic sensors 34, and/or the rear ultrasonic sensors 35.

The operation switch 36 is a switch operated by the driver to receive the parking support, and is configured to supply a switch signal to the parking support control unit 10. The operation switch 36 has a function of selecting whether or not the parking support function is operated, a function of selecting types of the parking (garaging and parallel parking), and a function of selecting whether or not an exit support function is operated. For example, the parking support control unit 10 is configured to switch the function depending on the number of tap operations on the operation switch 36, and a shift position when this operation is carried out. The parking support control unit 10 is configured to switch the support mode in an order of an OFF mode (mode in which parking support is not carried out), a garaging support mode, a parallel parking support mode, and the OFF mode each time the tap operation is carried out on the operation switch 36 when the shift position is a D position (drive position) or an R position (reverse position). Moreover, the parking support control unit 10 is configured to switch the support mode in an order of the OFF mode, an exit support mode, and the OFF mode each time the tap operation is carried out on the operation switch 36 when the shift position is a P position (parking position). This exit support mode is a mode for supporting an exit of the own vehicle when the own vehicle is parallel parked.

The vehicle state sensor 37 is a sensor for acquiring vehicle state information required for the parking support control and the collision avoidance control, and includes, for example, a vehicle speed sensor for detecting a vehicle speed, wheel speed sensors for detecting wheel speeds, an acceleration sensor for detecting an acceleration in a horizontal direction of the vehicle body, a yaw rate sensor for detecting a yaw rate of the vehicle body, a steering angle sensor for detecting a steering angle of the steered wheels, and a shift position sensor for detecting the shift position. A detection signal detected by the vehicle state sensor 37 is supplied to the parking support control unit 10 and the collision avoidance control unit 20.

Figure 2:
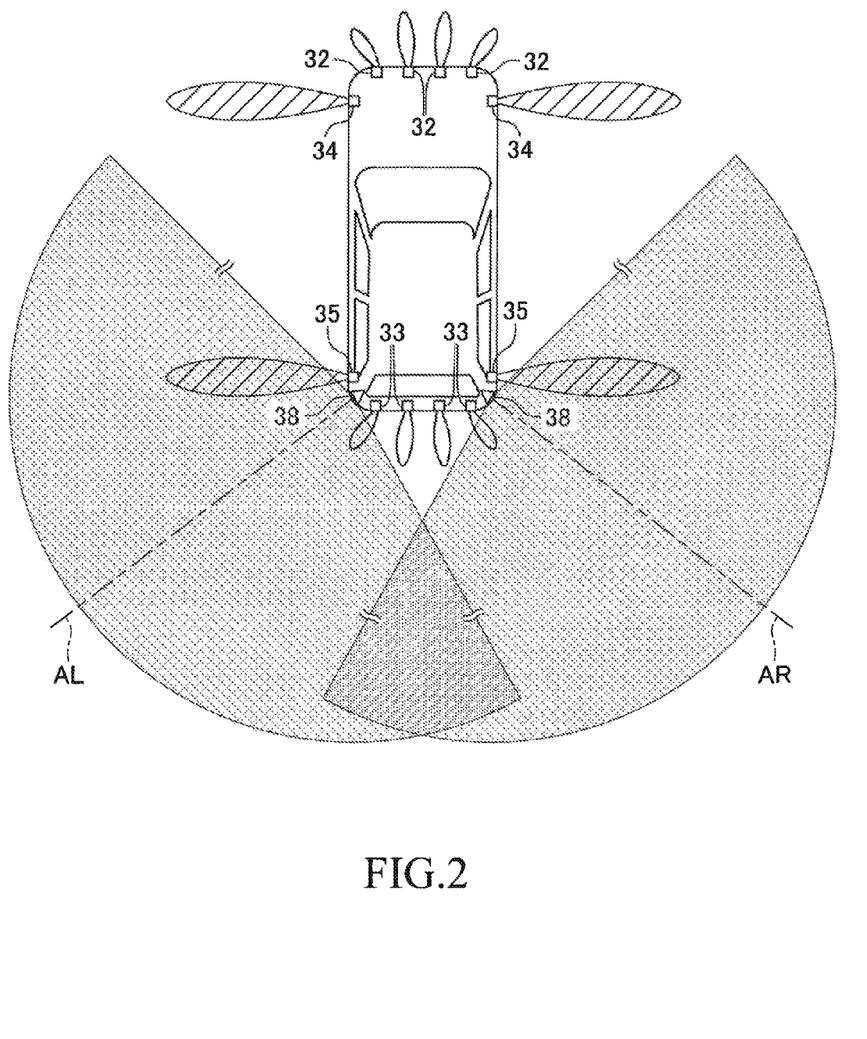
FIG. 2 is a plan view for illustrating detection areas of radar sensors, clearance sonars, and ultrasonic sensors.

One radar sensor 38 is mounted on each of left and right corner portions on the rear portion of the vehicle body. Each of the radar sensors 38 is configured to radiate an electric wave in the millimeter band (referred to as millimeter wave) to a rear periphery of the own vehicle, and receive, when an obstacle reflecting the millimeter wave exists in a radiation range, a reflected wave, thereby detecting the obstacle. As illustrated in FIG. 2, the radar sensors 38 are arranged so that radiation center axes AL and AR of the millimeter wave are directed outward with respect to the rear direction of the vehicle, and are each configured to radiate the millimeter wave in a range having predetermined left and right angles with respect to each of the radiation center axes AL and AR. As illustrated in FIG. 2, the detection areas (gray ranges) of the two radar sensors 38 overlap each other (range shaded in a darker color) on the rear region. Thus, those two radar sensors 38 can be used to detect an obstacle existing at least in the rear and rear lateral regions in the periphery of the own vehicle. The radar sensor 38 has a detection distance of some tens of meters, and can detect a far obstacle compared with the clearance sonars 32 and 33 and the ultrasonic sensors 34 and 35.

The radar sensor 38 is configured to generate a signal (beat signal) having a beat frequency acquired by subjecting a transmitted wave and a received wave to signal processing, set a direction in which a peak of the beat signal is detected as a direction in which an obstacle exists, and calculate a distance between the radar sensor 38 and the obstacle in this direction. One point of the obstacle is acquired as a detection point based on the direction and distance. The collision avoidance control unit 20 is configured to acquire the detection point of the obstacle at a predetermined sampling cycle from the radar sensor 38, and calculate a predicted travel route of the obstacle based on a transition (transition of a relative positional relationship between the own vehicle and the obstacle) of the detection point.

The steering ECU 40 is a control device for an electric power steering system, and is connected to a motor drive circuit 41. The motor drive circuit 41 is connected to a steering motor 42. The steering motor 42 is built into a steering mechanism (not shown), and is configured to use electric power supplied from the motor drive circuit 41 to rotate a rotor thereof, thereby steering the left and right steered wheels through the rotation of the rotor.

The steering ECU 40 is configured to detect, in a normal state, a steering torque of the driver, and generate an assist torque corresponding to the steering torque with the steering motor 42, thereby decreasing a load imposed on the steering operation of the driver. The steering ECU 40 is configured to control, when a steering command (target steering angle) for the parking support transmitted from the parking support control unit 10 is received in a state where the driver is not carrying out the steering operation, drive of the steering motor 42 in accordance with the steering command, thereby steering the steered wheels.

The brake ECU 50 is connected to a brake actuator 51. The brake actuator 51 is provided in a hydraulic circuit between a master cylinder (not shown) configured to pressurize working fluid by a depressing force on a brake pedal and friction brake mechanisms 52 provided respectively on the front/rear left/right wheels. The friction brake mechanism 52 includes a brake disc 52a fixed to the wheel and a brake caliper 52b fixed to the vehicle body, and is configured to use a hydraulic pressure of the working fluid supplied from the brake actuator 51 to operate a wheel cylinder built into the brake caliper 52b so as to press brake pads against the brake disc 52a, thereby generating a friction braking force.

The brake actuator 51 is a publicly known actuator configured to adjust the hydraulic pressure to be supplied to the wheel cylinders built into the brake calipers 52b, and supply the wheel cylinders with a hydraulic pressure corresponding to a control command from the brake ECU 50, thereby generating braking forces on the front/rear left/right wheels.

The brake ECU 50 is configured to control, when a braking command (target deceleration) transmitted from the collision avoidance control unit 20 is received, the brake actuator 51 in accordance with the braking command so as to acquire the target deceleration, thereby generating the friction braking forces with the friction brake mechanisms 52.

The engine ECU 60 is connected to an electronic throttle 61. The electronic throttle 61 is configured to adjust an opening degree of a throttle valve in accordance with a throttle opening degree signal transmitted from the engine ECU 60. Moreover, the engine ECU 60 is configured to transmit a valve closing command to the electronic throttle 61 when a braking command transmitted from the collision avoidance control unit 20 is received, thereby fully closing the throttle valve. As a result, engine braking is actuated.

The display device 71 is connected to the parking support control unit 10, and is configured to display a parking support image (image acquired by synthesizing the image taken by the rear camera 31 with various guide lines and the like) in accordance with an image signal supplied from the parking support control unit 10. This display device 71 is a touch panel-type display device, and is configured to supply a touch operation signal input from a display panel to the parking support control unit 10. Thus, the driver can touch the display panel while viewing the image displayed on the display device 71, thereby setting a target parking position and the like.

The speaker 72 is connected to the parking support control unit 10, and is configured to provide voice guidance required for the parking support control. In place of the voice guidance, for example, the display device 71 may be used to provide the guidance. In this case, the speaker 72 can be omitted.

The buzzer 73 is connected to the collision avoidance control unit 20, and is configured to generate a buzzer sound in response to a buzzer drive signal transmitted from the collision avoidance control unit 20, thereby attracting the attention of the driver.

The parking support control unit 10 is configured to first measure the size of a parking space when the garaging support mode or the parallel parking support mode is selected by the operation switch 36. The driver operates the operation switch 36 to select the garaging support mode or the parallel parking support mode before the parking space in which the own vehicle is to be parked, and causes the own vehicle to travel forward beside the parking space. The parking support control unit 10 is configured to use the front ultrasonic sensor 34 and the rear ultrasonic sensor 35 while the own vehicle is traveling beside the parking space to measure the size of the parking space, and make an announcement for guiding the own vehicle to a predetermined position from which the parking support starts when the measurement is finished. The driver moves the own vehicle to the predetermined position in accordance with this announcement. The parking support control unit 10 is configured to display the image taken by the rear camera 31 on the display device 71, display the parking space lines on the displayed image, allow the driver to correct the position of the parking space lines depending on necessity, and set final parking space lines (target parking position). The size of the parking space may also be measured by processing the image data taken by the rear camera 31, thereby detecting the parking space partition lines.

When the target parking position is set in this way, the parking support control unit 10 calculates a target path for moving the own vehicle from the current position to the target parking position based on the size of the parking space and the size of the own vehicle. The driver causes the own vehicle to slowly creep backward while releasing the brake pedal. The backward travel of the own vehicle is not limited to the creeping, and the driver may cause the own vehicle to move backward while depressing the accelerator pedal. The parking support control unit 10 is configured to calculate a target steering angle at a predetermined calculation cycle so that the own vehicle travels on the target path, and transmit a steering command representing the calculated target steering angle to the steering ECU 40. During this backward travel of the own vehicle, the target steering angle is calculated depending on a backward travel position of the own vehicle based on the sensor value detected by the vehicle state sensor 37. Moreover, the parking support control unit 10 is configured to use the clearance sonars 32 and 33 to highly precisely detect the parking space during the backward travel of the own vehicle, and correct the target parking position (target path) depending on necessity. The parking support control unit 10 is configured to use the speaker 72 to make an announcement of stopping the vehicle immediately before the own vehicle reaches the target parking position. As a result of the automatic steering being carried out in this way, the driver can park the own vehicle at the target parking position only through the pedal operation (as well as a shift change operation depending on necessity) without the steering wheel operation.

Moreover, the parking support control unit 10 is configured to use, when the exit support mode is set, the ultrasonic sensors 34 and 35 and the clearance sonars 32 and 33 to measure the size of the parking space, and when the direction of the steering does not need to be changed (in a case where only forward travel is necessary for the exit without backward travel), announce this state, to finish the exit support mode. Thus, when, in the parallel parking state, an inter-vehicle distance to a vehicle parked ahead is short, and the exit cannot be carried out only through the forward travel, the exit support is carried out. In this case, the parking support control unit 10 calculates a target path for the own vehicle to exit from the parking space based on the size of the parking space and the size of the own vehicle. The parking support control unit 10 is configured to make an announcement for a longitudinal movement of the own vehicle within the extent of the parking space, and successively calculate a target path depending on the travel position of the own vehicle. The parking support control unit 10 is configured to calculate a target steering angle at a predetermined calculation cycle so that the own vehicle travels on the target path, and transmit a steering command representing the calculated target steering angle to the steering ECU 40. As a result of the automatic steering being carried out in this way, the driver can make the own vehicle exit from the parking position in the parallel parking state only through the pedal operation and the shift change operation without the steering wheel operation.

The parking support control unit 10 transmits a state signal representing the on-going support state to the collision avoidance control unit 20. For example, the parking support control unit 10 transmits, as the state signal, a signal representing "0" when the parking support is not carried out (when the OFF mode is set). Moreover, the parking support control unit 10 transmits, as the state signal, a signal representing "1" when the garaging support is carried out (when the garaging support mode is set). Further, the parking support control unit 10 transmits, as the state signal, a signal representing "2" when the parallel parking support is carried out (when the parallel parking support mode is set). Still further, the parking support control unit 10 transmits, as the state signal, a signal representing "3" when the exit support is carried out (when the exit support mode is set). The collision avoidance control unit 20 can recognize the on-going support state of the parking support control unit 10 based on those state signals.

The collision avoidance control unit 20 is configured to acquire information (information of a detection point) on an obstacle acquired by the radar sensor 38 at a predetermined cycle, and calculate a predicted travel route of the obstacle based on a transition (transition of a relative positional relationship between the own vehicle and the obstacle) of this detection point. Moreover, the collision avoidance control unit 20 is configured to calculate a predicted backward travel route of the own vehicle based on the vehicle state (e.g., the vehicle speed, the steering angle, the yaw rate, a lateral acceleration, and a longitudinal acceleration) detected by the vehicle state sensor 37, and determine whether or not the own vehicle collides with the obstacle based on the predicted travel route of the obstacle and the predicted backward travel route of the own vehicle.

As illustrated in FIG. 4, the collision avoidance control unit 20 is configured to calculate a cross point CP at which the predicted travel route of the obstacle (in this diagram, an approaching vehicle) and the predicted backward travel route of the own vehicle cross each other, and calculate a distance from the own vehicle to the cross point CP and a distance from the obstacle to the cross point CP. The collision avoidance control unit 20 is configured to calculate a period until the own vehicle reaches the cross point CP and a period until the obstacle reaches the cross point CP on the assumption that the own vehicle and the obstacle maintain their current travel states (e.g., the vehicle speeds) to travel. When the own vehicle and the obstacle reach the cross point CP at timings approximately the same with each other, the own vehicle and the obstacle collide with each other.

The collision avoidance control unit 20 is configured to determine, when the own vehicle and the obstacle are predicted to collide with each other, whether or not the driver can avoid the collision through a collision avoidance operation (brake operation) before the own vehicle and the obstacle collide with each other. When the period (referred to as "predicted time to collision") until the own vehicle reaches the cross point CP is long, the collision can be avoided by the collision avoidance operation of the driver. In this case, the collision avoidance control unit 20 does not operate the automatic braking. On the other hand, when the predicted time to collision is short, the collision may not be avoided by the collision avoidance operation of the driver. In this case, the collision avoidance control unit 20 determines that the own vehicle and the obstacle are highly likely to collide with each other, and operate the automatic braking.

The collision avoidance control unit 20 is configured to calculate a deceleration required to stop the own vehicle before the cross point CP, and determine whether or not the absolute value of the required deceleration (−Greq) is more than the absolute value of a reference deceleration (−Gref) set in advance. This reference deceleration (−Gref) is set to a value close to a limit deceleration that can be generated by the pedal operation of an ordinary driver. When the absolute value of the required deceleration (−Greq) is more than the absolute value of the reference deceleration (−Gref) (|−Greq|>|−Gref−|), the collision may not be avoided only by the brake operation of the driver. Thus, the collision avoidance control unit 20 determines that the own vehicle is highly likely to collide with the obstacle, and operates the automatic braking. The required deceleration (−Greq) serves as an indication value for representing the likelihood of the collision of the own vehicle with the obstacle. The reference deceleration (−Gref) serves as a reference value for determining whether or not the own vehicle is highly likely to collide with the obstacle.

As a result, for example, in a case where another vehicle is approaching, from a rear lateral region of the own vehicle, the backward travel route of the own vehicle so as to cross the backward travel route of the own vehicle during the backward travel of the own vehicle, the automatic braking is operated, and the collision can thus be avoided even when the driver does not notice the another vehicle.

As described above, when the millimeter wave transmitted from the radar sensor 38 is reflected by a guard rail, and the reflected wave is received by the radar sensor 38, the automatic braking may unnecessarily be operated. When the own vehicle approaches the guard rail while traveling backward, the own vehicle is carrying out the parallel parking or exiting from the parallel parking state in most cases. Thus, the collision avoidance control unit 20 is configured to inhibit, based on the state signal transmitted by the parking support control unit 10, the collision avoidance control when the parallel parking support mode or the exit support mode is set, thereby preventing the automatic braking from unnecessarily being operated due to the approach of the own vehicle to the guard rail.

Figure 3:
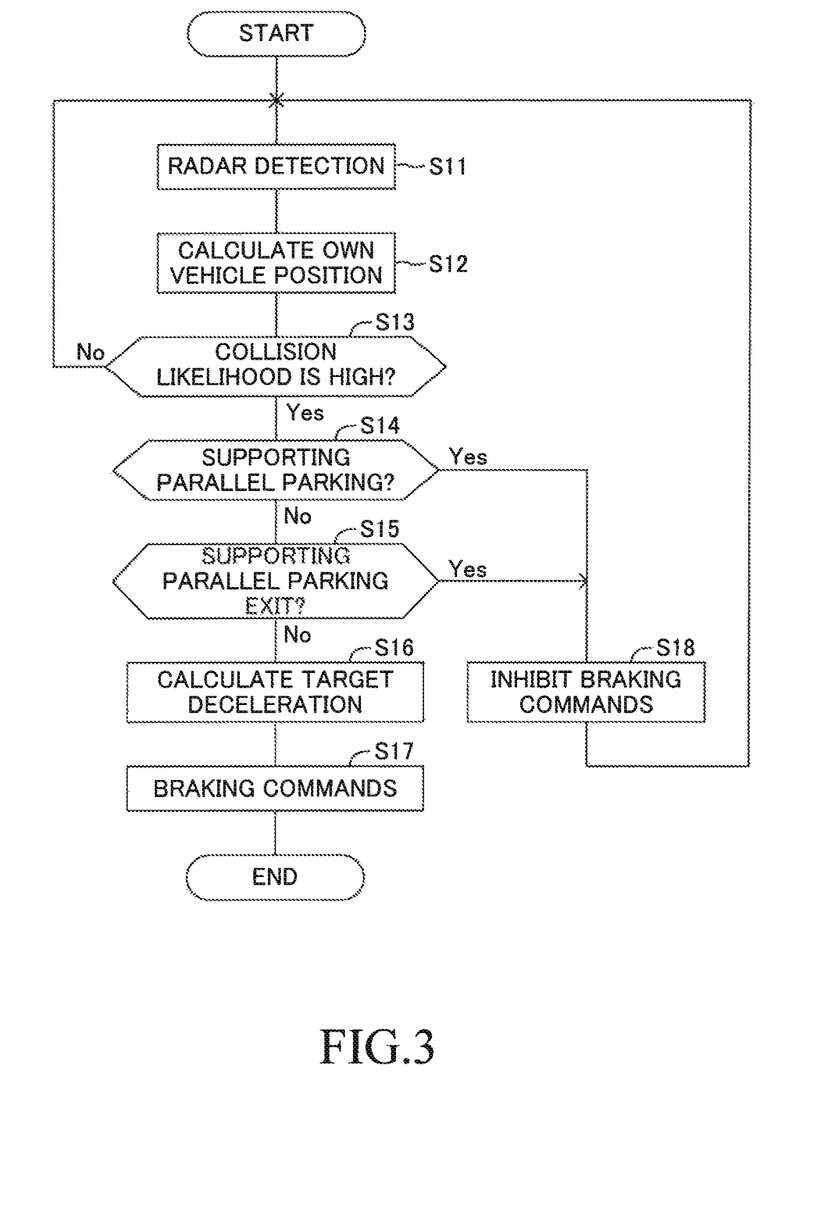
FIG. 3 is a flowchart for illustrating a collision avoidance control routine.

FIG. 3 is a flowchart for illustrating a collision avoidance control routine executed by the collision avoidance control unit. This collision avoidance control routine is executed when the own vehicle is traveling backward.

In Step S11, the collision avoidance control unit 20 acquires a detection point detected by the radar sensor 38, and calculates the relative positional relationship of the obstacle to the own vehicle (the distance from the radar sensor 38 to the obstacle (detection point) and the direction of the obstacle with respect to the radar sensor 38) based on the detection point. The relative predicted travel route of the obstacle can be acquired based on the transition of the relative positional relationship of the obstacle with respect to the own vehicle.

Then, in Step S12, the collision avoidance control unit 20 calculates the position (travel amount) of the own vehicle based on the detection signal of the vehicle state sensor 37. As a result, the predicted backward travel route of the own vehicle can be acquired.

Then, in Step S13, the collision avoidance control unit 20 determines whether or not the likelihood of the collision between the own vehicle and the obstacle is high. Specifically, the collision avoidance control unit 20 calculates the cross point CP at which the predicted backward travel route of the own vehicle and the predicted travel route of the obstacle cross each other based on both of the travel routes, and determines that the own vehicle and the obstacle are likely to collide with each other when the own vehicle and the obstacle reach the cross point CP at timings approximately the same with each other. In this case, the collision avoidance control unit 20 determines whether or not the absolute value of the required deceleration |−Greq| required to stop the own vehicle before the cross point CP is more than the absolute value of the reference deceleration |−Gref|. When the absolute value of the required deceleration |−Greq| is equal to or less than the absolute value of the reference deceleration |−Gref|, the collision avoidance control unit 20 determines that the likelihood of the collision between the own vehicle and the obstacle is not high (No in Step S13), and returns to Step S11.

When the collision avoidance control unit 20 determines that the likelihood of the collision between the own vehicle and the obstacle is high (Yes in Step S13) while repeating this processing at a predetermined calculation cycle, the collision avoidance control unit 20 proceeds to Step S14. In Step S14, the collision avoidance control unit 20 reads the state signal transmitted by the parking support control unit 10, and determines whether or not the state signal represents the state where the parallel parking support is being carried out, i.e., whether or not the state signal is "2". When the state is not the state where the parallel parking support is being carried out (No in Step S14), in Step S15, the collision avoidance control unit 20 determines whether or not the state signal represents the state where the exit support is being carried out, i.e., whether or not the state signal is "3".

When the state is not the state where the exit support is being carried out (No in Step S15), in Step S16, the collision avoidance control unit 20 calculates the target deceleration required to stop the own vehicle before the cross point CP. This target deceleration can be calculated based on the distance from the own vehicle to the cross point CP and the vehicle speed of the own vehicle at the current time point.

Then, the collision avoidance control unit 20 transmits the braking command representing the target deceleration to the brake ECU 50, and transmits the braking command representing a throttle fully closing command to the engine ECU 60. As a result, the brake ECU 50 controls the operation of the brake actuator 51 so as to acquire the target deceleration, thereby causing the friction brake mechanisms 52 to generate the friction braking forces. For example, the brake ECU 50 uses the acceleration sensor to detect the backward deceleration of the own vehicle, and carries out feedback control so that this deceleration reaches the target deceleration. Moreover, the engine ECU 60 fully closes the throttle valve, thereby actuating the engine braking. As a result, the automatic braking is operated to stop the own vehicle.

In Step S17, when the collision avoidance control unit 20 transmits the braking commands, the collision avoidance control unit 20 finishes this routine. Then, the collision avoidance control unit 20 resumes this routine at a predetermined timing.

On the other hand, in Step S14 or S15, when a determination of "Yes" is made, that is, when the current state is the state where the parallel parking support is being carried out or the state where the exit support is being carried out, the collision avoidance control unit 20 proceeds to Step S18, and sets the mode to a braking command inhibition mode in which the transmission of the braking commands is inhibited. In other words, even when the collision avoidance control unit 20 determines that the likelihood of the collision between the own vehicle and the obstacle is high, in the case where the state signal transmitted from the parking support control unit 10 represents "2" or "3" (which corresponds to the specific state according to the present invention. This state is hereinafter referred to as "specific state"), the collision avoidance control unit 20 inhibits itself from transmitting the braking commands to the brake ECU 50 and the engine ECU 60. Thus, the operation of the automatic braking is inhibited. After the collision avoidance control unit 20 sets the mode to the braking command inhibition mode, the collision avoidance control unit 20 returns to Step S11, and repeats the above-mentioned processing. When the state signal returns to "0", the braking command inhibition mode is reset.

With the driving support device according to this embodiment described above, when the parallel parking support or the exit support from the parallel parking state is carried out by the parking support control unit 10, the operation of the automatic braking by the collision avoidance control is inhibited. As a result, the frequency of the unnecessary operation of the automatic braking due to the millimeter wave reflected by a guard rail can be decreased.

Figure 7:
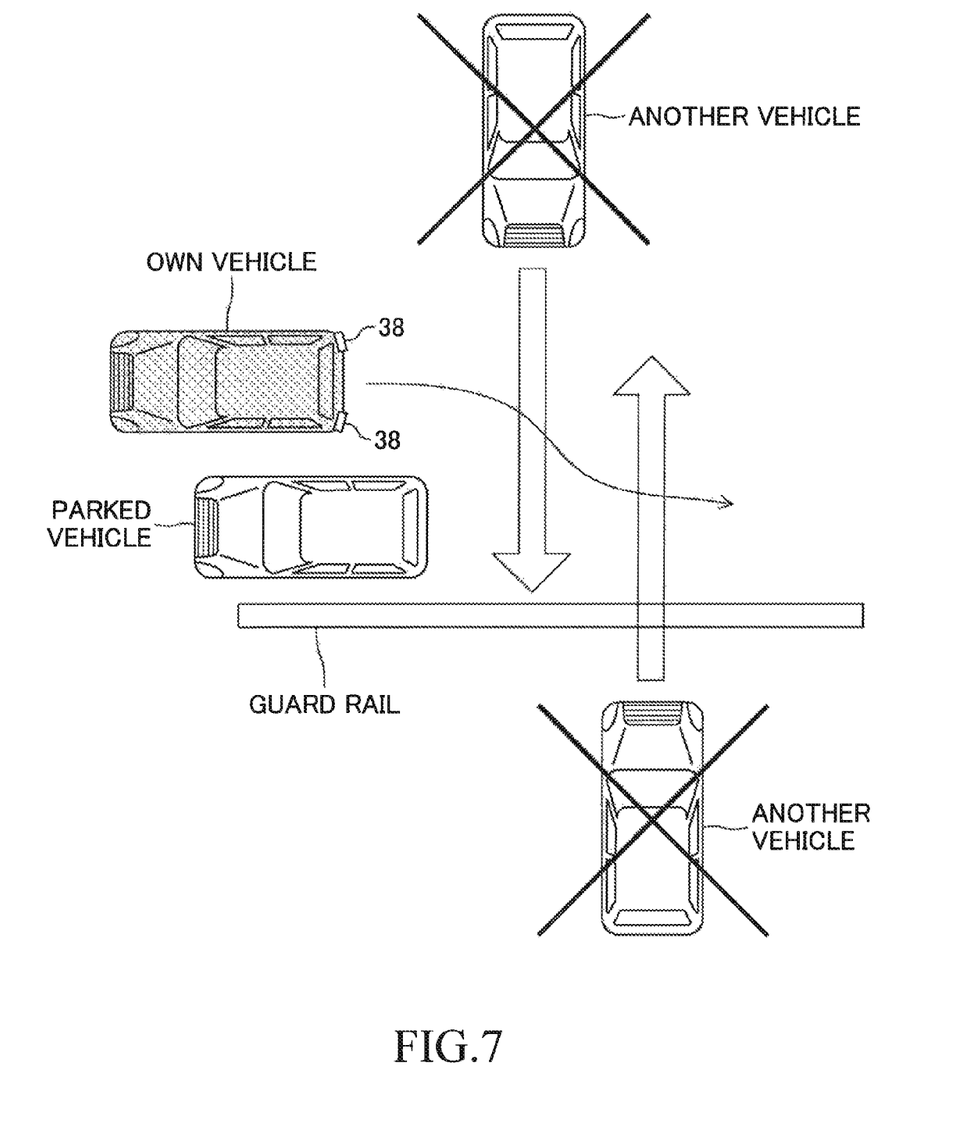
FIG. 7 is an explanatory diagram for illustrating a fact that another vehicle does not approach an own vehicle from a rear lateral region of the own vehicle during the parallel parking.

Moreover, when the own vehicle is carrying out the parallel parking along a guard rail, or is exiting from the parallel parking state, as illustrated in FIG. 7, another vehicle rarely approaches the own vehicle from the laterally rear region of the own vehicle. Thus, even when the operation of the automatic braking is inhibited, this inhibition does not practically lead to a decrease in the function of the collision avoidance control unit 20.

The parking support control unit 10 is used for carrying out the parking support control. The rear camera 31, the clearance sonars 32 and 33, the ultrasonic sensors 34 and 35, the operation switch 36, the steering ECU 40 (including the motor drive circuit and the motor), the display device 71, and the speaker 72 are used for the parking support control. The parking support control unit 10, the rear camera 31, the clearance sonars 32 and 33, the ultrasonic sensors 34 and 35, the operation switch 36, the steering ECU 40, the display device 71, and the speaker 72 correspond to a parking support system according to the present invention. Moreover, the collision avoidance control unit 20 for carrying out the collision avoidance control, the radar sensors 38 used for the collision avoidance control, the brake ECU 50 (including the brake actuator 51 and the friction brake mechanisms 52), and the engine ECU 60 (including the electronic throttle 61) correspond to a rear-end collision avoidance support system according to the present invention.

In the above description, the driving support device according to this embodiment has been described, but the present invention is not limited to the above-mentioned embodiment, and various changes are possible within the range not departing from the object of the present invention.

For example, the driving support device according to this embodiment has the exit support function for the exit of the own vehicle from the parallel parking state, but the driving support device may not have the exit support function. Moreover, even when the driving support device has the parallel parking exit support function, the automatic braking does not always need to be inhibited during the exit support. Moreover, the parking support function eliminates the necessity of the steering operation of the driver, but the parking support function may further eliminate the necessity of the pedal operation.

Figure 8:
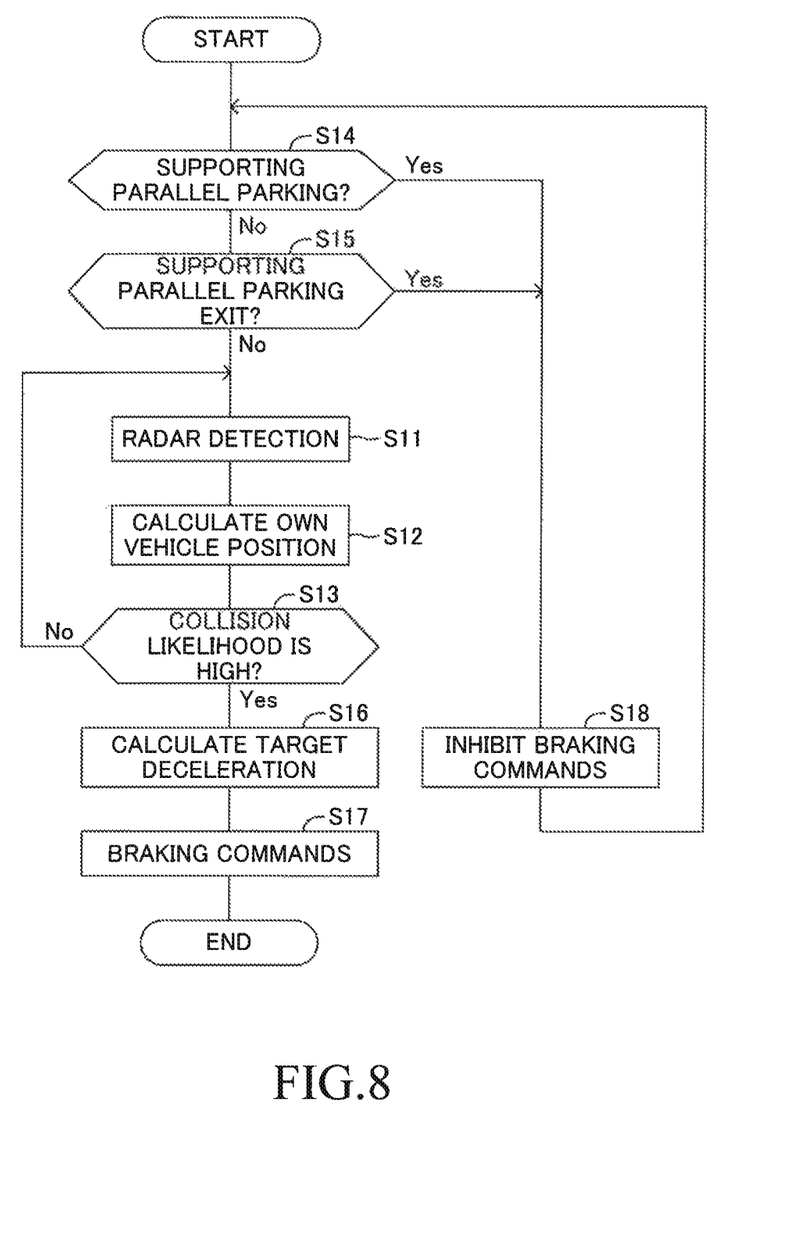
FIG. 8 is a flowchart for illustrating a modified example of the collision avoidance control routine.

Moreover, the collision avoidance control unit 20 may execute a collision avoidance control routine according to a modified example illustrated in FIG. 8 in place of the collision avoidance control routine according to the embodiment illustrated in FIG. 3. This collision avoidance control routine according to the modified example is acquired by changing the sequence of the processing in the collision avoidance control routine according to the embodiment, and the processing of determining whether or not the current state is the specific state (Steps S14 and S15) is carried out before the processing of determining the likelihood of the collision (Steps S11, S12, and S13). In this case, the processing of determining the likelihood of the collision in the specific state does not need to be carried out in the collision avoidance control routine according to the modified example, and the calculation load is thus light. On the other hand, the collision avoidance control routine according to the embodiment always carries out the determination processing for the likelihood of the collision, and is thus excellent in responsiveness of the automatic braking for the collision avoidance.

Moreover, according to this embodiment, when the collision avoidance control unit 20 detects that the specific state holds true, the collision avoidance control unit 20 inhibits itself from transmitting the braking commands to the brake ECU 50 and the engine ECU 60. Alternatively, for example, when the parking support control unit 10 carries out the parallel parking support and (or) the exit support, the parking support control unit 10 may transmit an inhibition command inhibiting the transmission of the braking command to the collision avoidance control unit 20. In this case, the collision avoidance control unit 20 does not transmit the braking commands to the brake ECU 50 and the engine ECU 60 (does not carry out the automatic braking) based on the inhibition command transmitted from the parking support control unit 10. Moreover, when the parking support control unit 10 carries out the parallel parking support and (or) the exit support, the parking support control unit 10 may transmit inhibition commands inhibiting the automatic braking to the brake ECU 50 and the engine ECU 60. In this case, the brake ECU 50 and the engine ECU 60 prioritize, based on the inhibition commands transmitted from the parking support control unit 10, the inhibition commands from the parking support control unit 10, and does not carry out the automatic braking even when the braking commands are received from the collision avoidance control unit 20.

What is claimed is:

1. A driving support device for a vehicle, comprising:
a rear-end collision avoidance support system for using a radar sensor to detect an obstacle approaching a backward travel route of an own vehicle so as to cross the backward travel route, and operating automatic braking of the own vehicle when the obstacle is highly likely to collide with the own vehicle;
a parking support system having at least a parallel parking function, for automatically steering a steered wheel so that the own vehicle travels along a target path for parking the own vehicle at a target parking position;
state determination means for determining whether or not a specific state where the parking support system carries out an operation of parallel parking the own vehicle holds true; and
automatic braking inhibition means for inhibiting an operation of the automatic braking by the rear-end collision avoidance support system when the specific state is determined to hold true.

2. A driving support device for a vehicle according to claim 1, wherein:
the parking support system includes a parallel parking exit function of automatically steering the steered wheel so that the own vehicle travels along a target path for causing the own vehicle to exit from a parallel parking state; and
the specific state includes a state where the parking support system carries out an operation of causing the own vehicle to exit from the parallel parking state.

* * * * *